United States Patent
Gu et al.

(10) Patent No.: US 6,845,089 B1
(45) Date of Patent: Jan. 18, 2005

(54) METHOD OF CONTINUOUSLY TRANSMITTING USER DATA ON A REVERSE COMMON CHANNEL IN A MOBILE COMMUNICATION SYSTEM

(75) Inventors: Chang-Hoi Gu, Songnam-shi (KR); Jae-Min Ahn, Seoul (KR); Ki-Sung Jung, Yongin-shi (KR); Soon-Young Yoon, Seoul (KR); Hyun-Seok Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/291,387

(22) Filed: Apr. 14, 1999

(30) Foreign Application Priority Data

Apr. 14, 1998 (KR) ............................................ 98-14275

(51) Int. Cl.⁷ .............................................. H04B 7/212
(52) U.S. Cl. ...................... 370/337; 370/329; 455/515; 455/434
(58) Field of Search ................................ 370/337, 329, 370/339, 336, 345–347, 474, 311, 236, 341, 431, 335, 468, 441, 443, 442, 338; 395/875; 455/434, 515, 517, 403, 186.1, 450, 452.1, 452, 516; 340/825.5; 714/746–749

(56) References Cited

U.S. PATENT DOCUMENTS

| | | | | |
|---|---|---|---|---|
| 5,485,463 A | * | 1/1996 | Godoroja .................. 370/95.1 |
| 5,517,507 A | * | 5/1996 | Needham et al. ............. 371/32 |
| 5,644,576 A | * | 7/1997 | Bauchot et al. ............. 370/437 |
| 5,673,259 A | * | 9/1997 | Quick, Jr. .................... 370/342 |
| 5,878,277 A | * | 3/1999 | Ohta .......................... 395/857 |
| 5,995,496 A | * | 11/1999 | Honkasalo et al. ......... 370/318 |
| 6,031,827 A | * | 2/2000 | Rikkinen et al. ........... 370/330 |
| 6,078,572 A | * | 6/2000 | Tanno et al. ................ 370/335 |
| 6,108,530 A | * | 8/2000 | Ayabe et al. ................ 455/403 |
| 6,240,083 B1 | * | 5/2001 | Wright et al. ............... 370/348 |
| 6,621,807 B1 | * | 9/2003 | Jung et al. .................. 370/335 |

FOREIGN PATENT DOCUMENTS

| | | | |
|---|---|---|---|
| JP | 10366746 A | * 12/1998 | ............ H04Q/7/38 |
| KR | 1998-13149 | 4/1998 | |
| KR | 1998-14276 | 4/1998 | |

* cited by examiner

Primary Examiner—Edward F. Urban
Assistant Examiner—Charles Chow
(74) Attorney, Agent, or Firm—Dillworth & Barrese LLP

(57) ABSTRACT

A method is provided of continuously transmitting user data on a reverse common channel in a mobile communication system without a reverse dedicated channel. The user data is divided into a plurality of segmented messages if the user data is longer than a data segment in a frame of the reverse common channel. The plurality of segmented messages are then transmitted in the data segments of consecutive frames on the reverse common channel. The method further comprises determining whether a base station receives the segmented messages by receiving a response message indicating reception of the segmented messages. The common channel is preferably a power-controlled logical dedicated channel.

23 Claims, 16 Drawing Sheets

METHOD OF CONTINUOUSLY TRANSMITTING USER DATA ON A REVERSE COMMON CHANNEL IN A MOBILE COMMUNICATION SYSTEM

PRIORITY

This application claims priority to an application entitled "Method of Continuously Transmitting Packet Data on Reverse Common channel in Mobile Communication System" filed in the Korean Industrial Property Office on Apr. 14, 1998 and assigned Serial No. 98-14275, the contents of which are hereby incorporated by reference.

BACKGROUND

1. Field of the Invention

The present invention relates generally to a mobile communication system, and in particular, to a method of continuously transmitting user data on a reverse common channel in a mobile communication system.

2. Description of the Related Art

The third generation (3G) IS-95 supports multiple data services in addition to standard voice services including: transmission of high quality voice, high speed data, moving pictures, and internet browsing. In this mobile communication system, a forward link is directed from a base station (BS) to a mobile station (MS) and a reverse link is directed from the MS to the BS. A paging channel and an access channel, generally referred to as common channels, are used to transport data between a BS 4 and an MS 2 before a voice call set-up, as shown in FIG. 10. The BS 4 sends a message on the paging channel and receives a response message from the MS 2 on the access channel. The MS 2 sends a message on the access channel and receives a response message from the BS 4 on the paging channel. A plurality of paging channels and access channels are available for use. The paging channels are typically modulated by Walsh codes and the access channels are modulated by Long codes.

The 3G IS-95 is satisfactory for voice communications but fails to fully ensure high communication quality for packet data communication, where a large amount of packet data including a long burst period and an idle period is transmitted by an RLP (Radio Link Protocol) and short burst data is transmitted by an RBP (Radio Burst Protocol). RBP is a transmission scheme for determining whether to retransmit the same SDB (Short Data Burst) frame or to send another SDB frame depending on an acknowledgement signal (ACK) or negative acknowledgement signal (NACK) received for the previously sent SDB frame in a dormant burst state of the 3G IS-95.

Thus, in the 3G IS-95 system, the RBP has relatively low transmission efficiency, reliability and long response time, since the RBP is confined to a burst substate of the dormant state. Further, since the RBP is implemented on a burst substate of the dormant state with reverse common channel only, the process of sending an SDB frame, receiving a response, and then sending another SDB frame takes a long time, thus causing excessive delay in effecting packet data communications.

It is, therefore, an object of the present invention to provide a method of continuously transmitting a long burst message on a reverse common channel.

It is another object of the present invention to provide a method of implementing a full-duplex RBP transmission scheme in which an SDB message is continuously transmitted on a reverse common channel in a burst substate of the dormant state.

It is a further object of the present invention to provide a method of enabling a long burst message transmission when power control is performed on a designated reverse common channel to appropriately control an initial system access power to minimize response time and increase transmission efficiency.

It is still a further object of the present invention to provide a method of continuously transmitting burst data without initializing an RLP by setting a control channel from a dormant state or a suspended state to a control hold state or an active state.

SUMMARY

To achieve these and other objects, a method is provided of continuously transmitting user data on a reverse common channel in a mobile communication system without a reverse dedicated channel. The user data is divided into a plurality of segmented messages if the user data is longer than a data segment in a frame of the reverse common channel. The plurality of segmented messages are then transmitted in the data segments of consecutive frames on the reverse common channel. The method further comprises determining whether a base station receives the segmented messages by receiving a response message indicating reception of the segmented messages. The plurality of segmented messages is preferably loaded on the data segments of consecutive frames on the reverse common channel designated as a power-controlled logical dedicated channel.

DETAILED DESCRIPTION OF PREFERRED EMBODIMENTS

Figure 1A:
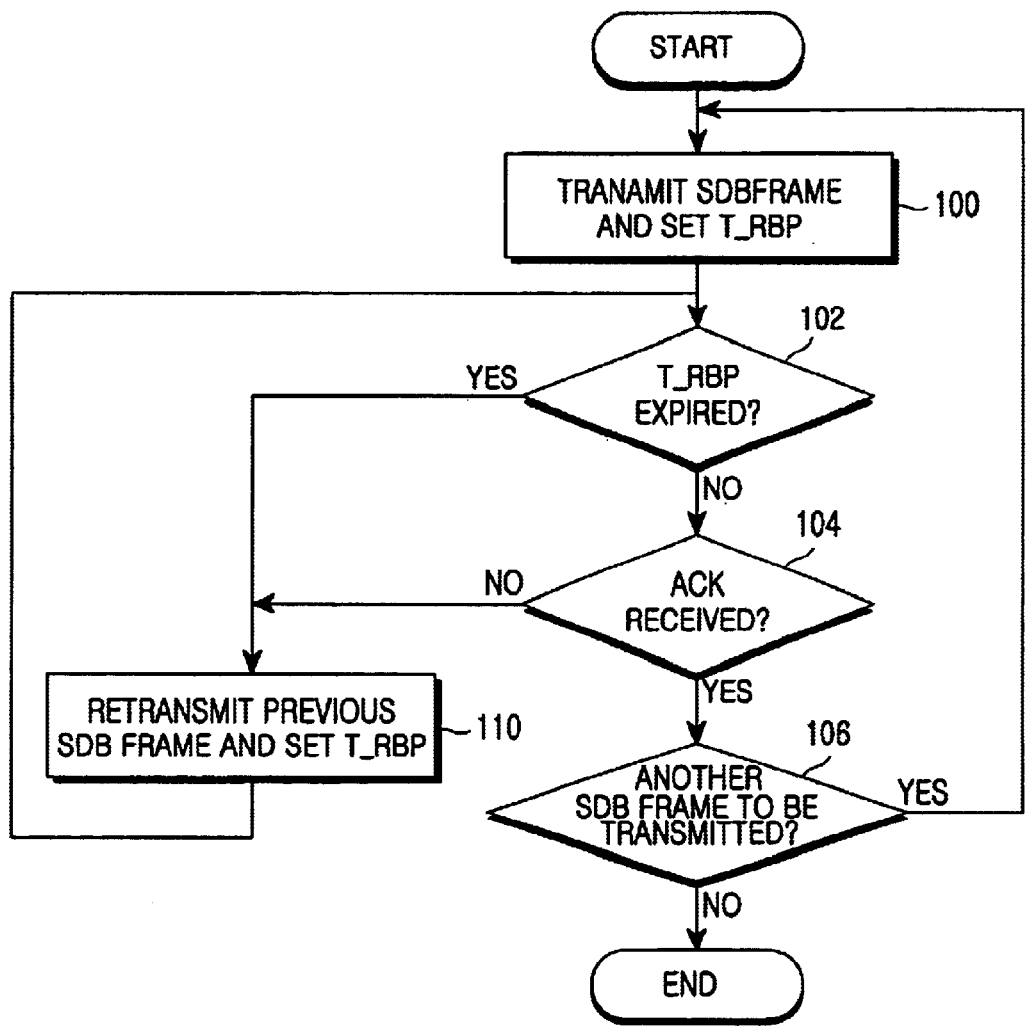
FIG. 1A is a flowchart illustrating a prior art method of transmitting a Short Data Burst (SDB) message from a mobile station (MS) on a reverse commnon channel in a burst substate of a dormant state.

It is to be understood that in the following description of preferred embodiments, specific details are set forth to provide a more thorough understanding of the present invention, notwithstanding that one skilled in the art may practice the invention without these specific details. It is to be further understood that in the accompanying drawings, similar reference numerals are used to denote elements having similar or equivalent constructions. In the following description, well known functions or constructions may not be described in detail since they would obscure the invention in unnecessary detail.

Figure 11:
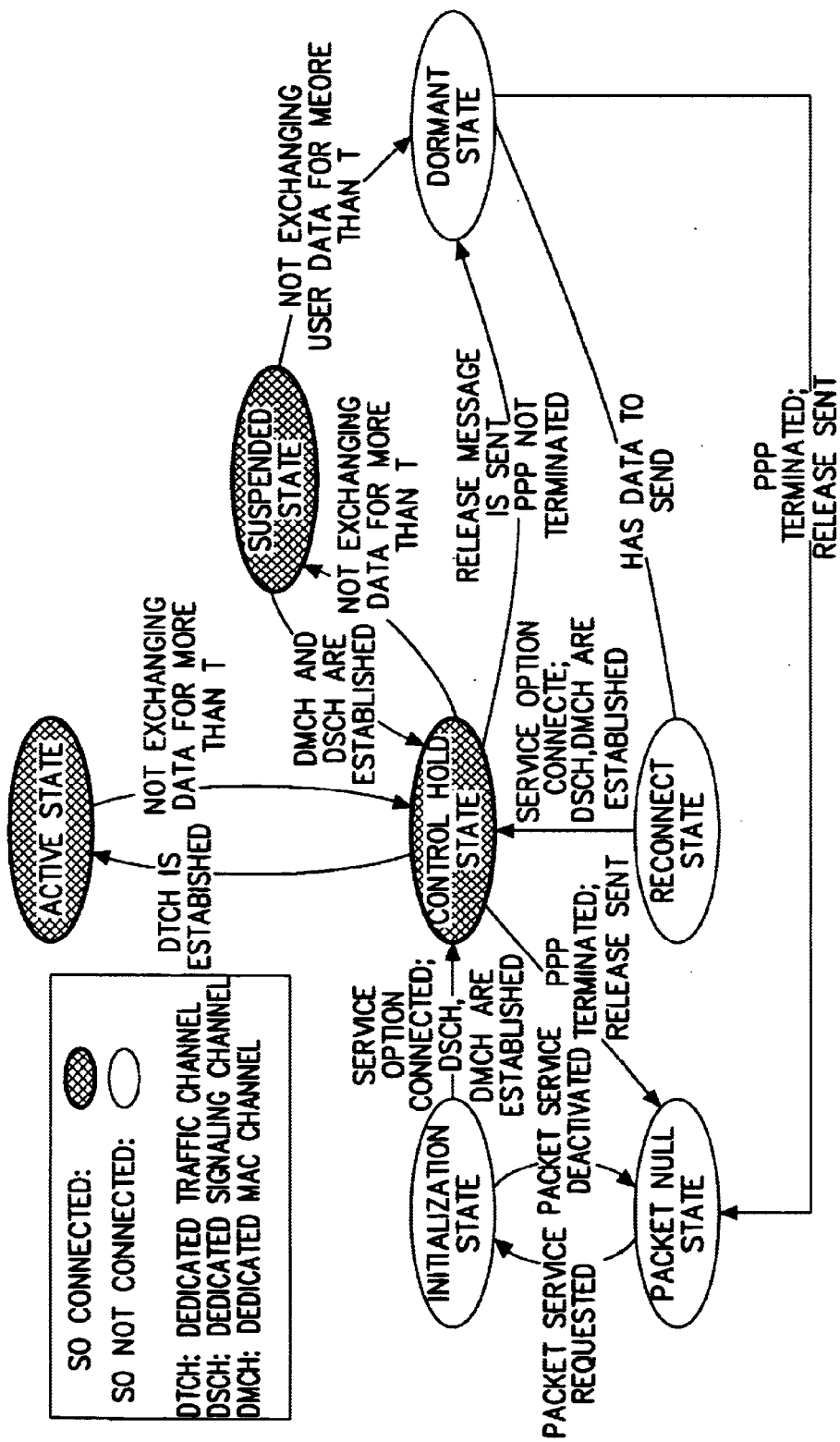
FIG. 11 is a diagram illustrating packet service states in a mobile communication system.

For a better understanding of the present invention, packet service states in a communication system will now be described with reference to FIG. 11. As shown, a packet service is composed of a packet null state, an initialization state, an active state, a control hold state, a suspended state, a dormant state, and a reconnect state. Packet service options are connected in the control hold state, active state, and suspended state. The packet null state refers to a default state prior to activation of the packet service.

Upon request for a packet service in the packet null state, a connection to the packet service is attempted in the initialization state. When a dedicated control channel (DCCH) is set, the initialization state transitions to the control hold state. The DCCH is needed to initialize an RLP and a PPP (Point-to-Point Protocol). In the active state, the logical dedicated traffic channels (DTCHs) are maintained on the physical forward and reverse DCCHs and RLP frames are exchanged on the channels. When a relatively short inactive period is produced, the packet service enters the suspended state to efficiently use the radio resources and reduce power consumption of the MS. While the DCCHs are released in the suspended state, both the BS and MS reserve RLP status information, traffic channel assignment, encryption variables, and the like to facilitate assignment to the DCCHs.

In the suspended state, the MS monitors a paging channel. Upon designation of a DCCH, the suspended state transitions to the control hold state. If a packet is not received for a predetermined time in the suspended state, the dormant state is entered. The dormant state is composed of an idle substate and a burst substate and refers to the state where packet service options, control and traffic channels, and the RLP are released, with only the PPP being maintained. The dormant state transitions to the packet null state if the PPP is released.

Figure 1B:
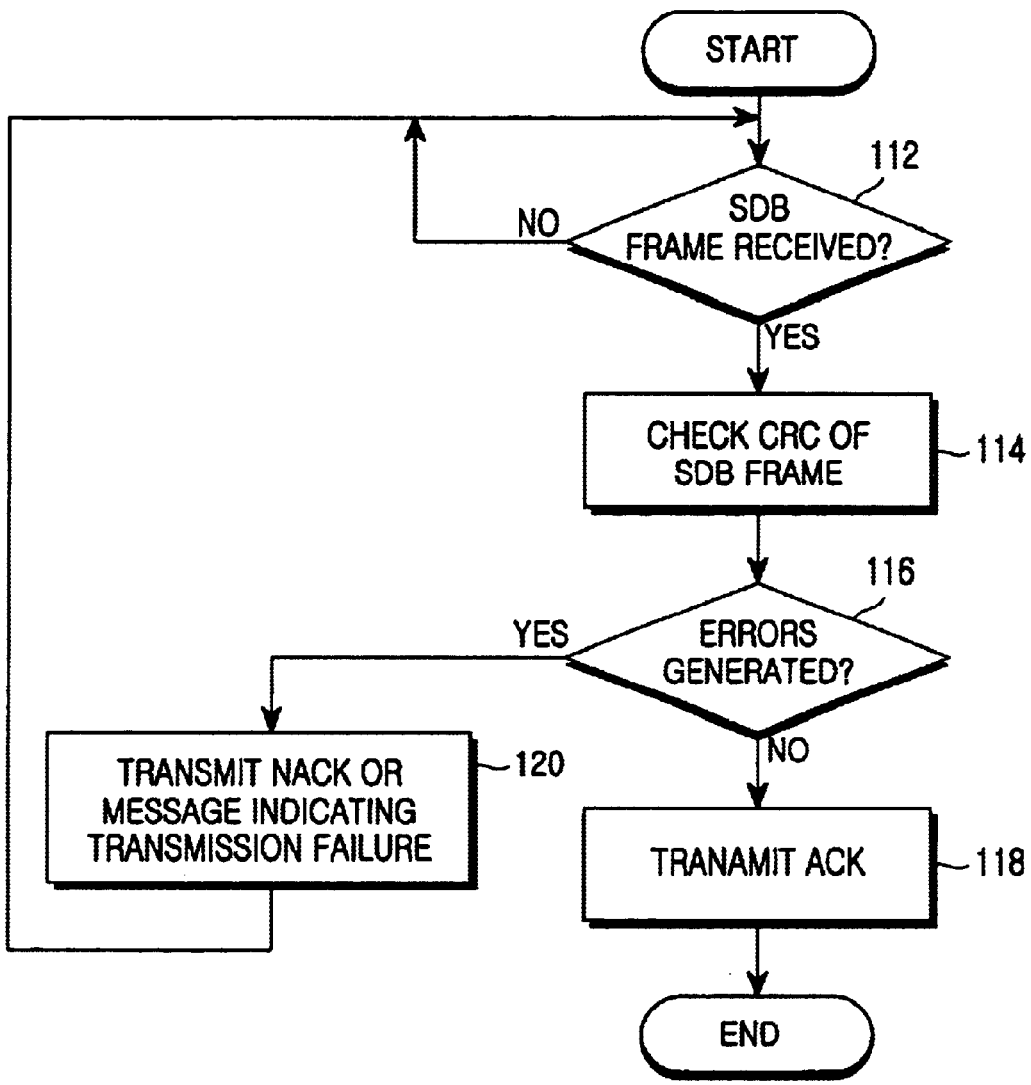
FIG. 1B is a flowchart illustrating a prior art method of receiving an SDB message in a base station (BS) on a reverse common channel in a burst substate of a dormant state.

FIGS. 1A and 1B, are flowcharts illustrating prior art methods of an MS operation for transmitting an SDB message and a BS operation for receiving the SDB message on a reverse common channel in the burst substate of the dormant state in accordance with the 3G IS-95 protocol. After the MS 2 sends an SDB frame on a reverse common channel (i.e., access channel), reception of an acknowledgement signal ACK from the BS 4 on a paging channel indicates a successful transmission. Repeated reception of a negative acknowledgement signal NACK or failure to receive a response message from the BS 4 for a predetermined time, (i.e. until a timer T_RBP has expired) indicates a failed transmission. The BS 4 checks the CRC (Cyclic Redundancy Code) of the SDB frame received on the reverse common channel (access channel) to decide whether to send the acknowledgement signal ACK or the negative acknowledgement signal NACK on the forward paging channel.

With continued reference to FIGS. 1A and 1B, the MS 2 sends an SDB frame on a reverse common channel and sets the timer T_RBP in step 100. The BS 4 determines whether the SDB frame is received on the reverse common channel in step 112. If received, the BS 4 checks the CRC of the SDB frame in step 114 and determines the presence or absence of errors in the SDB frame in step 116. If no CRC errors were generated, the BS 4 sends the MS 2 the acknowledgement signal ACK indicating a successful transmission on the paging channel, in step 118. If CRC errors were found, the BS 4 sends the MS 2 the negative acknowledgement signal NACK or a message indicating a failed transmission in step 120.

The MS 2 determines whether the signal (i.e. ACK or NACK) is received before the timer T_RBP has expired, in steps 102 and 104 respectively. Upon receipt of the acknowledgement signal ACK, the MS 2 determines whether there is another SDB frame to send in step 106. If there is, the procedure returns to step 100. Otherwise, the procedure ends.

Otherwise, if the acknowledgement signal NACK or a message indicating a failed transmission is received before the timer T_RBP has expired, or if none of the signals ACK, NACK, or the message indicating a failed transmission are received prior to the expiration of the timer T_RBP in steps 102 and 104, the MS 2 retransmits the same SDB frame and resets the timer T_RBP in step 10. Then, the procedure returns to step 102.

Figure 2:
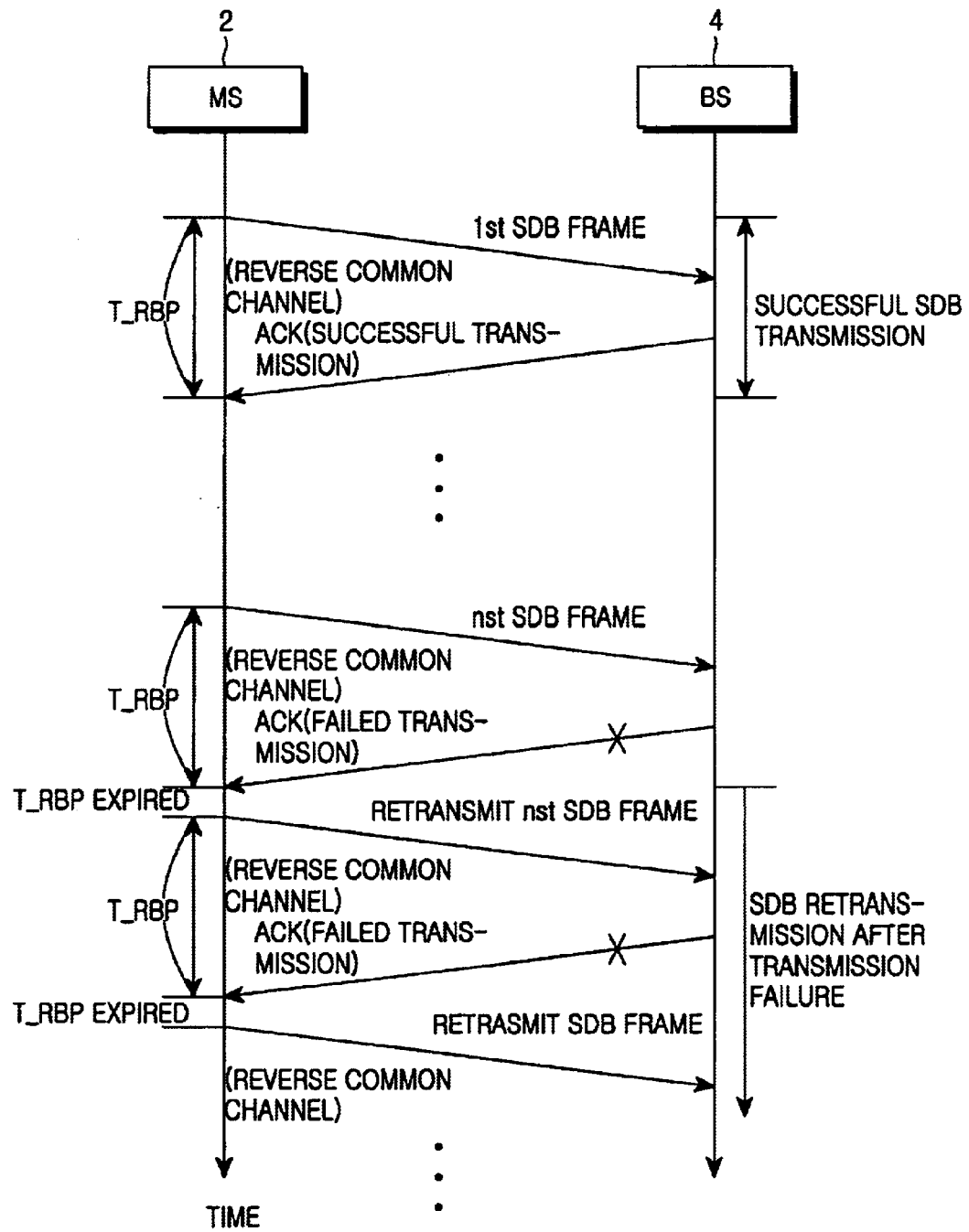
FIG. 2 is a diagram illustrating a prior art method of exchanging messages between the BS and the MS as shown by the flowcharts of FIGS. 11A and 11B.

FIG. 2 is a diagram illustrating a prior art method of exchanging messages between the BS 2 and the MS 4 of FIGS. 1A and 1B on the basis of the protocol.

One embodiment of the present invention is directed to the transmission of a long burst message by modifying the RBP transmission scheme described above. Before describing how a conventional RBP transmission scheme is modified according to the present invention, some explanation is required concerning the designation of a common channel and power control of the designated common channel.

A well-recognized example of a common channel designation is disclosed in Korean Application No. 1998-13149 filed on Apr. 13, 1998 entitled "Device and Method for Transmitting Common Channel Message in CDMA Communication System" by Ki-Sung JUNG, et. al. A detailed description of power control of a designated channel can be found in Korea Application No. 1998-14276 filed on Apr. 14, 1998 and entitled "Power Control of Reverse Common Channel in CDMA Communication System" by Jin-Woo CHOI, et. al.

The designation of a common channel (see Korean Application No. 1998-13149) refers to the process of designating a reverse common channel as dedicated (hereinafter, designated common channel) in a logical sense of the term when a message longer than one frame is generated, in order to continuously transmit the long message. More specifically, upon generation of a message to send, the MS 2 determines whether the message can be sent at one time. If it can be, the conventional RBP transmission scheme is used.

Otherwise, the long message is divided into frame segments, and a "more message flag" and a "designation request flag" of a frame are set prior to transmission of the frame to the BS 4. Upon receipt of the frame, the BS 4 monitors the more message flag and the designation request flag. If they are cleared, the BS 4 clears a designation flag and sends an acknowledgement to the MS 2. If either the more flag message or the designation request flag is set, the BS 4 determines whether there is a channel to designate and if there is, it designates the channel. The BS 4 sets a maximum duration and a priority for the designated channel when necessary, and sends the acknowledgement message to the MS 2.

An explanation will now be provided regarding the power control of the designated common channel (see Korean Patent No. 1998-14276). Since the BS 4 receives SDB frames continuously, a message sent by the BS 4 should include information concerning the previously described channel designation, as to whether to perform a power control, the Walsh code number of a common power control channel, and the location (i.e., slot index) of a power control signal if power control is performed. A predetermined time after the BS 4 sends a response message for the designated channel request to the MS 2, it sends a power control signal in a predefined slot on a power control dedicated channel at predetermined intervals. Then, the MS 2 sends preambles on the channel designated by the response message for a predetermined time and adjusts transmit power between the BS 4 and the MS 2. The MS 2 sends a transmit message to the BS 4 on the designated common channel a predetermined time later. While the BS 4 receives the message from the MS 2, it continuously controls power by sending the power control signal on the common power control channel.

An RBP for a continuous SDB message transmission can be implemented in accordance with described embodiments of the present invention if the above-described channel requirements of common channel designation and power control of a designated common channel are satisfied.

Figure 3A:
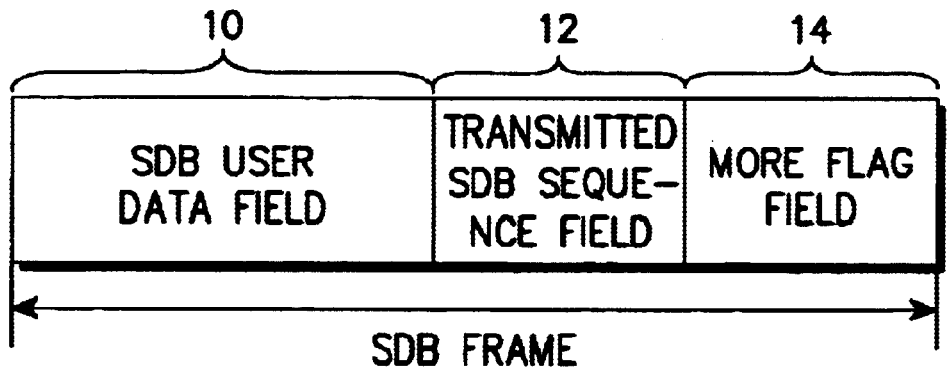
FIG. 3A illustrates the structure of an SDB frame in a continuous Radio Burst Protocol (RBP) transmission scheme according to an embodiment of the present invention.
Figure 3B:
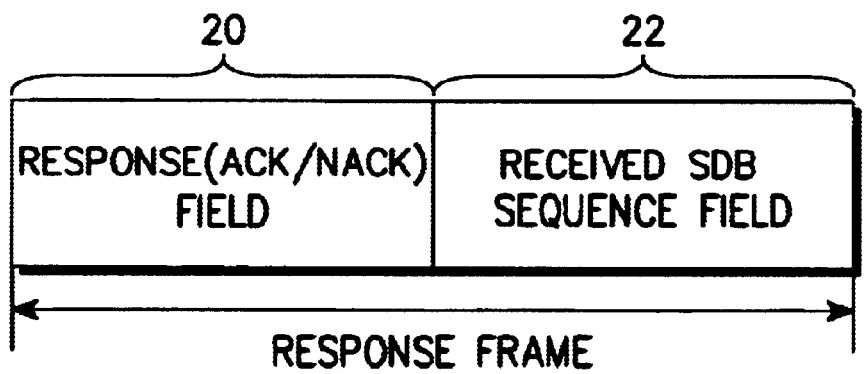
FIG. 3B illustrates the structure of a response frame for a received message in the continuous RBP transmission scheme according to the embodiment of the present invention.

Implementation of the RBP for a continuous SDB frame transmission according to the embodiments of the present invention requires an SDB frame as shown in FIG. 3A and a a response frame for a received message as shown in FIG. 3B. The SDB frame and the response frame are sent by the MS 2 and the BS 4, respectively.

In FIG. 3A, the SDB frame is comprised of an SDB user data field 10, a transmitted SDB sequence field 12, and a more flag field 14. The transmitted SDB sequence field 12 provides the sequence number of an 5 DB frame to be continuously transmitted from the MS 2, and the more flag field 14 indicates whether there is an SDB frame following the current SDB frame.

In FIG. 3B, the response frame is comprised of a response field 20 and a received SDB sequence field 22. The response field 20 informs the MS 2 of the presence or absence of errors in a received message by the signal ACK or NACK. The received SDB sequence field 22 provides the sequence number of the currently received SDB frame. The transmitted and received SDB sequence fields 12 and 22 contain the same bits.

An SDB message is transmitted continuously in one of two ways depending on a response from the BS 4: the signal NACK is sent only if the BS 4 detects errors; and the signal ACK or NACK is sent for each SDB frame received from the MS 2.

FIGS. 4A to 6 illustrate a first embodiment of a continuous RBP transmission scheme according to the present invention. FIGS. 7A to 9 illustrate a second embodiment of a continuous RBP transmission scheme.

First Embodiment

Figure 4A:
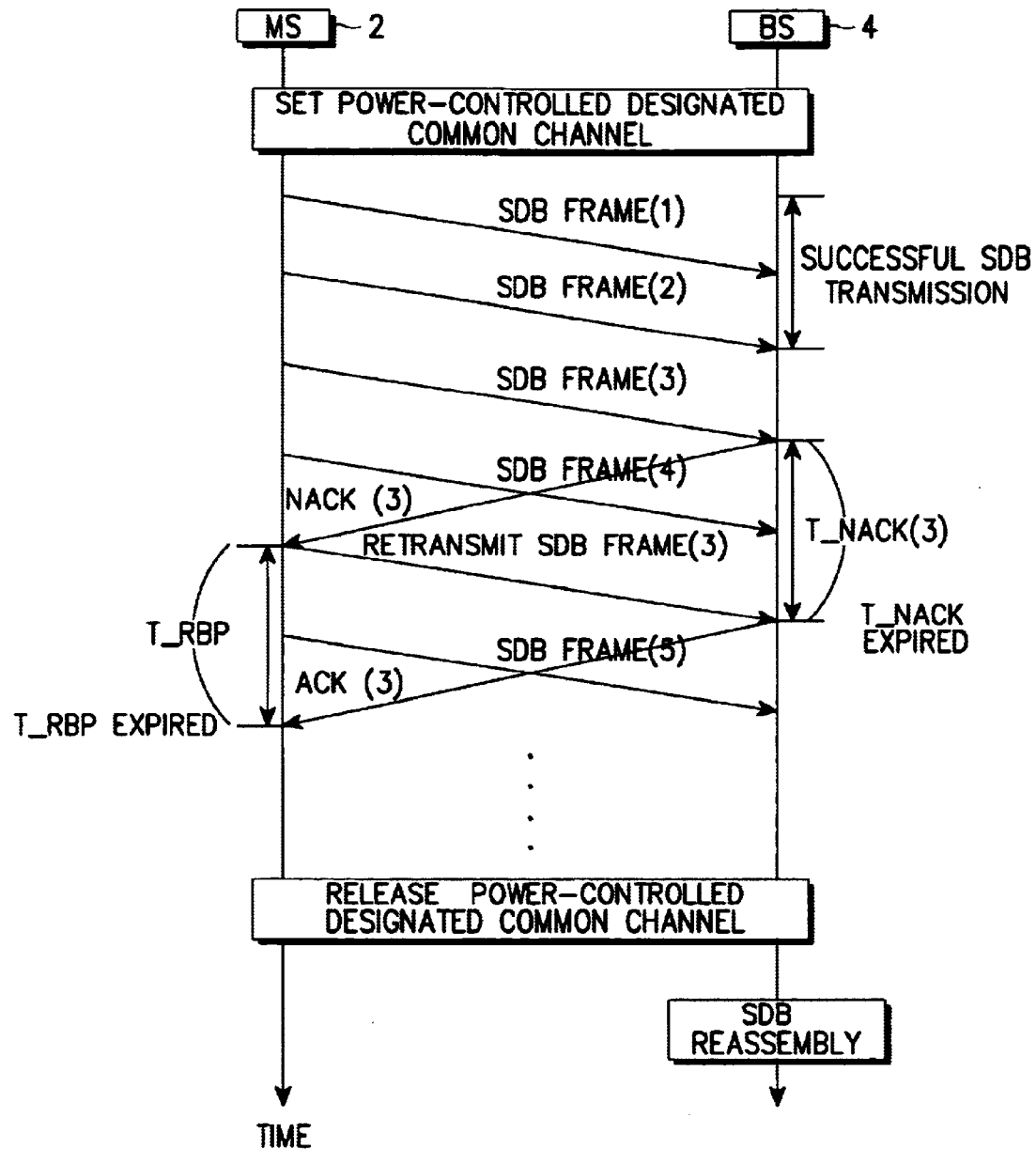
FIG. 4A is a diagram illustrating the exchange of messages and an error correcting operation upon generation of a negative acknowledgement signal NACK according to a first embodiment of the continuous RBP transmission scheme in which the negative acknowledgement signal NACK is transmitted only for an SDB frame having an error.

FIG. 4A is a diagram illustrating a message transmission/reception and an error correcting operation upon receipt of a signal NACK in accordance with a first embodiment of the RBP transmission scheme, where the signal NACK is transmitted only for an SDB frame having an error. The MS 2 receives a response message as shown in FIG. 3B from the BS 4 while the MS 2 sends SDB frames continuously on a power-controlled designated common channel. Upon receipt of the response message including the signal NACK, the MS 2 detects an SDB frame having an error by checking the received SDB sequence field 22 of the response message and retransmits the corresponding SDB frame. When the continuous RBP transmission procedure is completed, the BS 4 releases the power-controlled designated common channel and then reassembles received SDB frames based on an SDB sequence to construct a complete SDB message.

Figure 4B:
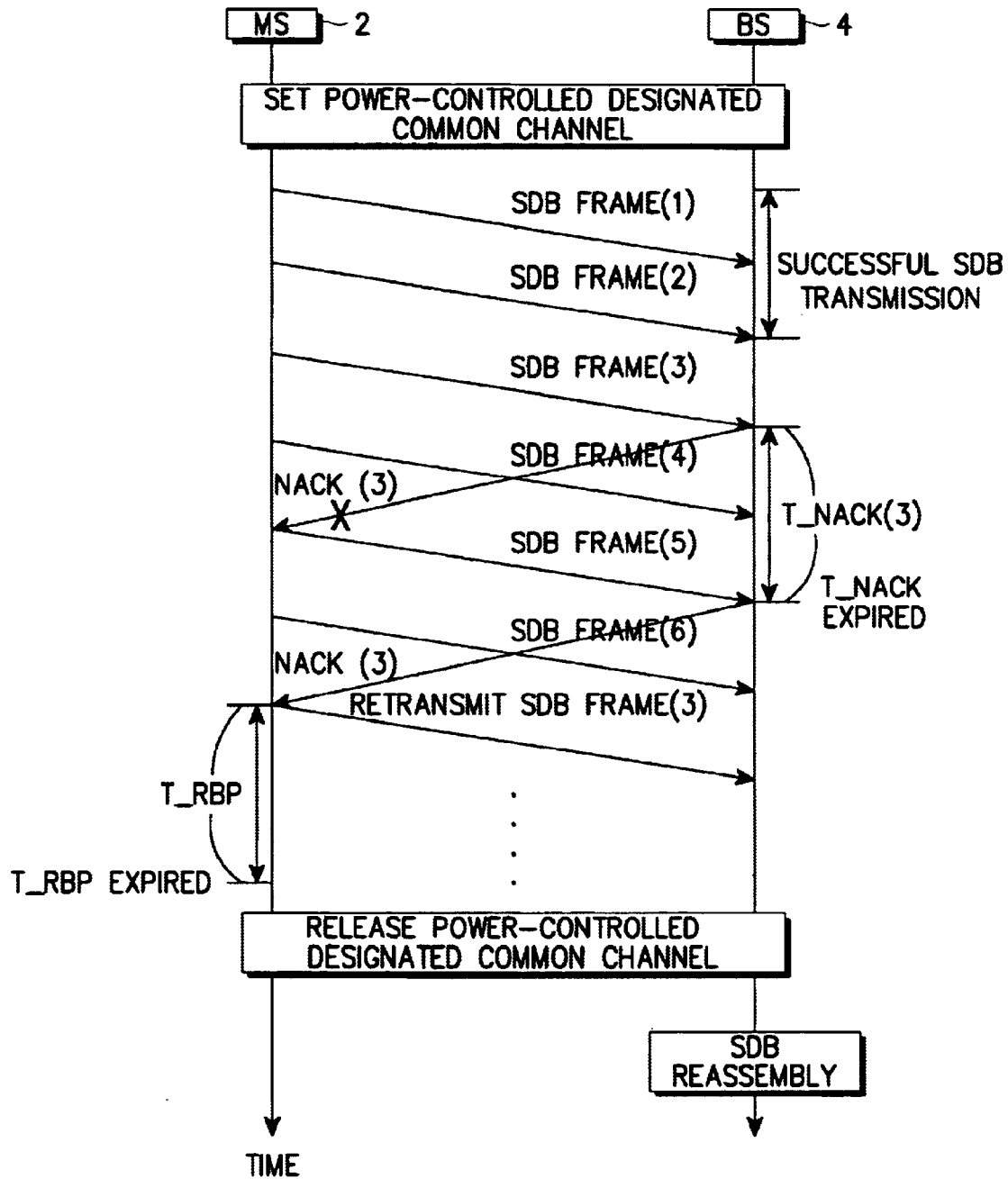
FIG. 4B is a diagram illustrating the exchange of messages and an error correcting operation upon loss of a negative acknowledgement signal NACK according to a first embodiment of the continuous RBP transmission scheme.

FIG. 4B is a diagram illustrating an error correcting operation when the MS 2 fails to receive the signal NACK due to the radio environment. If an SDB frame received from the MS 2 has errors, the BS 4 sends a response message having the signal NACK and a corresponding received SDB sequence number, and sets a timer T_NACK. If the SDB frame corresponding to the received SDB sequence number is not received from the MS 2 during the period T_NACK, the BS 4 considers the signal NACK to have been lost and retransmits the signal NACK. The MS 2 determines that the SDB frame was successfully transmitted, if the MS 2 does not receive the signal NACK. The MS 2 retransmits the SDB frame corresponding to the received SDB sequence number of the NACK response message only when it receives the signal NACK from the BS 4. When the continuous RBP transmission scheme is completed in this manner, the BS 4 releases the power-controlled designated common channel and then reassembles the received SDB frames based on an SDB sequence to construct a complete SDB message.

Figure 4C:
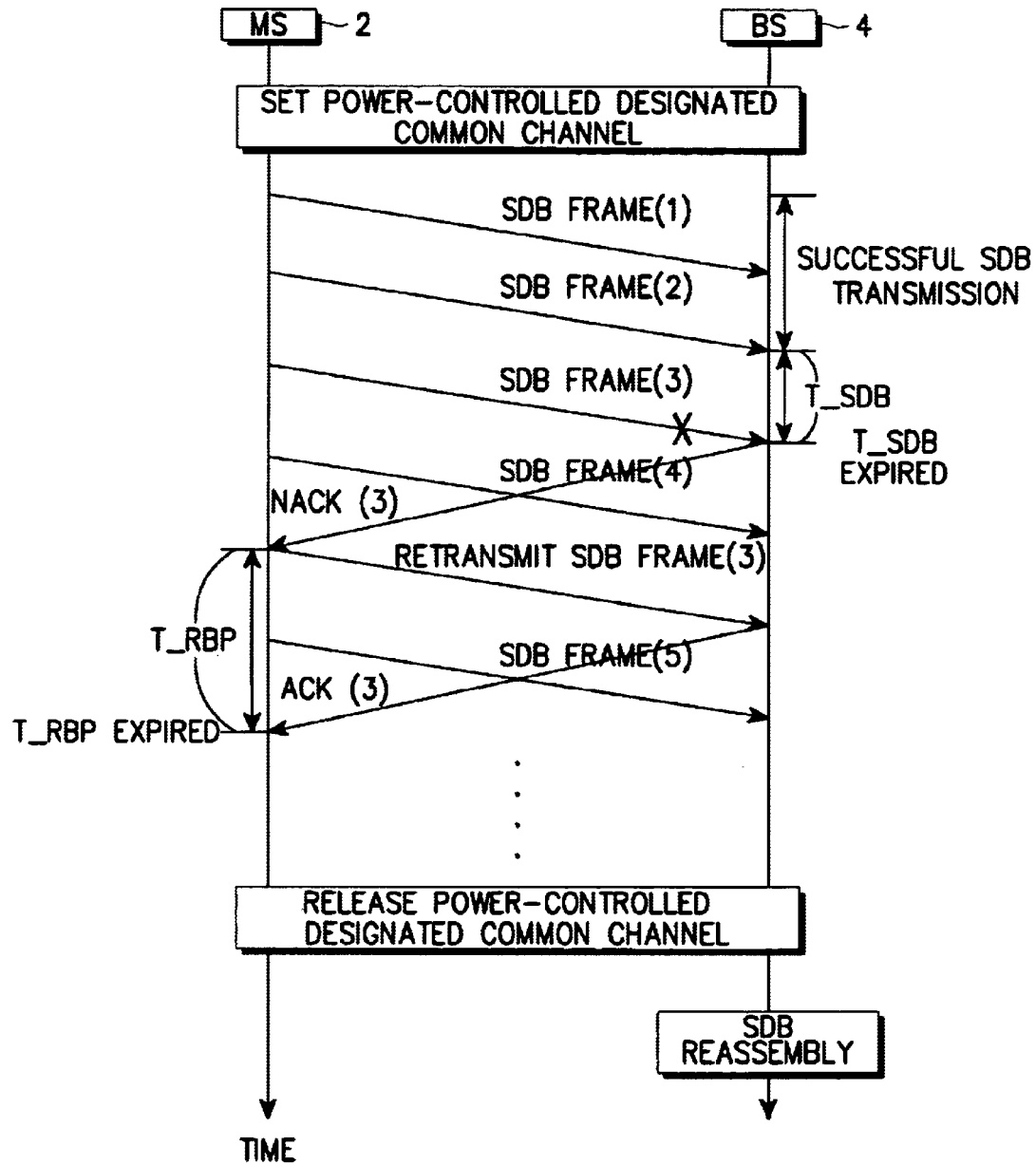
FIG. 4C is a diagram illustrating the exchange of messages and an error correcting operation upon loss of an MS initiated SDB frame according to a first embodiment of the continuous RBP transmission scheme.

FIG. 4C is a diagram illustrating an error correcting operation when an MS initiated SDB frame is lost during transmission. The BS 4 receives an SDB frame and checks the more flag field 14 of the SDB frame. If the more flag field 14 is set, the BS 4 sets a timer T_SDB and awaits the next SDB frame from the MS 2. If the BS 4 does not receive the next SDB frame until the timer T_SDB has expired, the BS 4 sends the MS 2 a response message with the response field set to NACK and the received SDB sequence field set to a sequence number following the transmitted SDB sequence number of the most recently received SDB frame which was MS initiated for the first time. The MS 2 considers the transmission of its initiated message to have been successful if it does not receive the signal NACK. When the continuous RBP transmission scheme is completed in this manner, the BS 4 releases the power-controlled designated common channel and then reassembles received SDB frames based on an SDB sequence to construct a complete SDB message.

Figure 5:
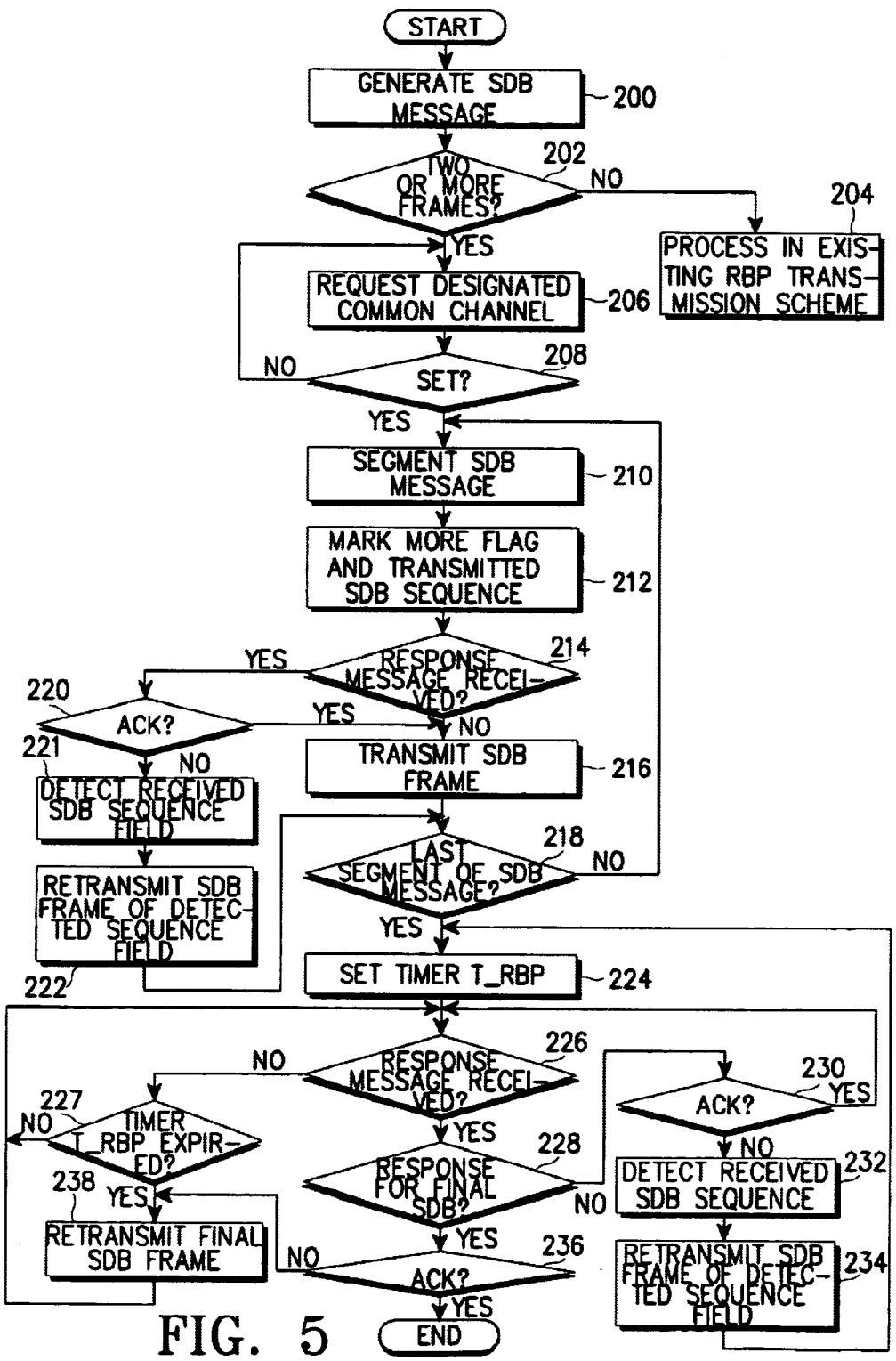
FIG. 5 is a flowchart illustrating an MS operation according to a first embodiment of the continuous RBP transmission scheme.
Figure 6:
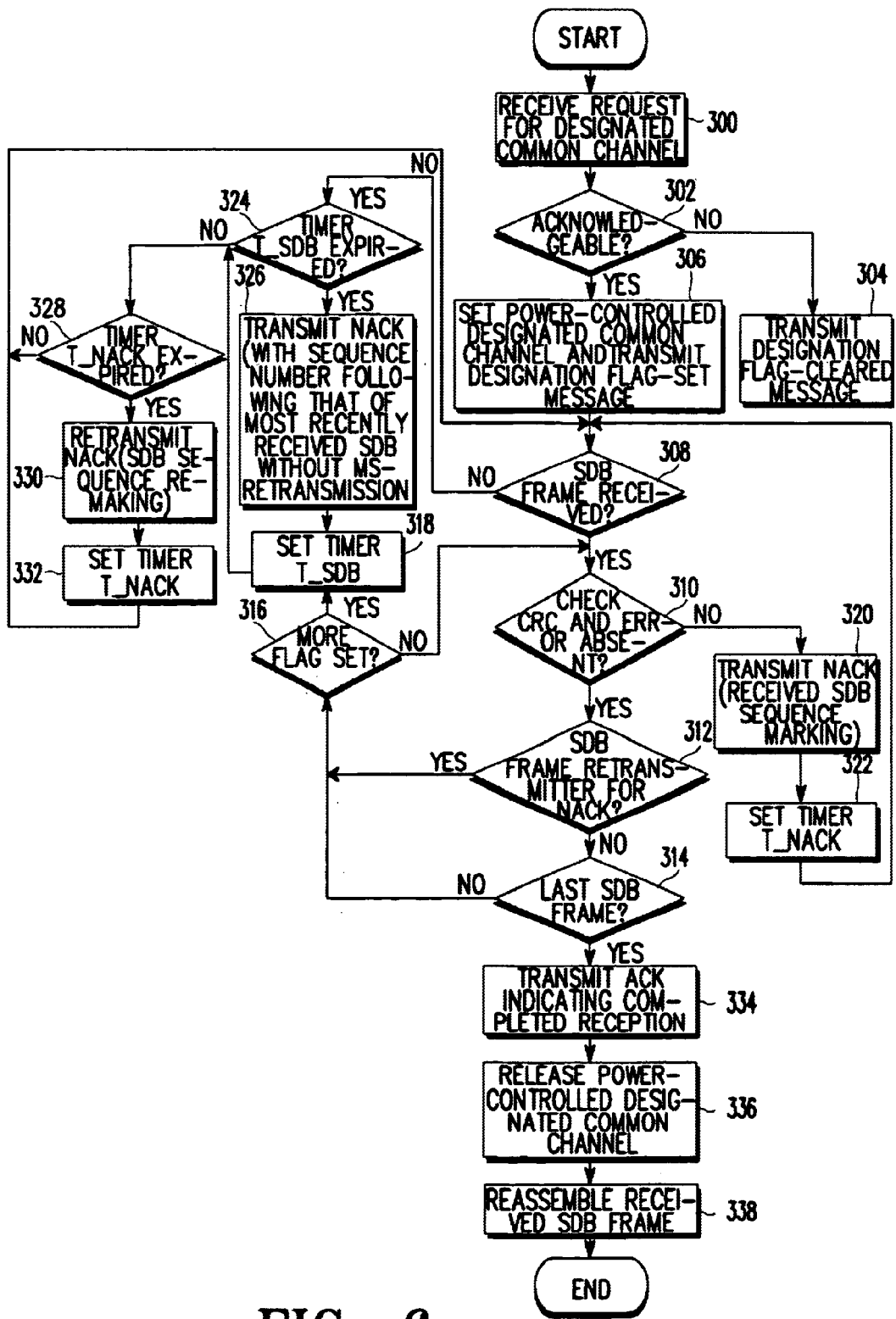
FIG. 6 is a flowchart illustrating a BS operation according to a first embodiment of the continuous RBP transmission scheme.

FIGS. 5 and 6 are flowcharts of an MS operation and a BS operation for data communication schemes in accordance with the described embodiments with reference to FIGS. 4A, 4B, and 4C. FIG. 5 is a flowchart of the MS operation in accordance with a first embodiment of the continuous RBP transmission scheme, and FIG. 6 is a flowchart of the BS operation in accordance with a second embodiment of the continuous RBP transmission scheme.

Referring to FIGS. 5 and 6, upon generation of an SDB message to send, in step 200 of FIG. 5, the MS 2 determines whether the SDB message contains two or more frames in step 202. If the SDB message is one frame, the SDB message is sent to the BS 4 in accordance with a conventional RBP transmission scheme. If the SDB message should be sent in two or more frames, the MS 2 requests assignment of a designated common channel from the BS 4 in step 206.

Upon receipt of the request for a designated common channel in step 300 of FIG. 6, the BS 4 determines whether there is an available designated common channel in step 302. If the request is not acknowledgeable, the BS 4 sends the MS 2 a message with a designation flag cleared, in step 304. If it is acknowledgeable, the BS 4 assigns a power-controlled designated common channel and sends a message to the MS 2 having a designation flag set in step 306.

The MS 2 determines whether the designation flag of the received message is set, in step 208. If it is not, the MS 2 resumes the request for a designated common channel in step 206. If the designation flag of the received message is set, the MS 2 divides the SDB message into frame segments in step 210. The segmented SDB is filled to the SDB user data field 10 shown in FIG. 3A. In step 212, the MS 2 sets the more flag field 14 and marks an SDB sequence number on the transmitted SDB sequence field 12. If the last SDB segment is to be sent, the more flag field 14 is reset. The MS 2 determines whether a response message is received from the BS 4, in step 214. When no response message is received, the MS 2 sends an SDB frame including the marked more flag and transmitted SDB sequence number and the SDB user data to the BS 4 on the power-controlled designated common channel in step 216. Then, the MS 2 determines whether the currently sent SDB frame is the last one, in step 218. If it is not, the procedure returns to step 210.

Meanwhile, the BS 4 determines whether the SDB frame is received in step 308. Upon receipt of the SDB frame, the BS 4 checks the CRC of the SDB frame and determines whether it contains an error, in step 310. If there are no errors, the BS 4 determines whether the received SDB frame was retransmitted by the MS 2 for the signal NACK, in step 312. If it is transmitted for the first time, the BS 4 determines whether the more flag of the SDB frame is set, in step 316. If the more flag is set, the BS 4 sets the timer T_SDB to correct errors if a following SDB frame is not received, in step 318. If the more flag is not set, the procedure goes to step 310. In step 328, the BS 4 determines whether the timer T_NACK has expired. The timer T_NACK is set to send the signal NACK from the BS 4 and thus not used when an SDB frame is normally received. If the timer T_NACK has not expired, the BS 4 returns to step 308.

In accordance with the embodiments of the present invention, the BS 4 sends no response message if an SDB frame is successfully received. For example, FIG. 4A shows that the BS 4 sends no response message for the successfully received SDB frames (1), (2), and (4). Here, (1), (2), and (4) denote sequence numbers of the SDB frames.

Returning to FIG. 6, if a CRC error is found in the received SDB frame in step 310, the BS 4 sends the signal NACK to the MS 2 in step 320. That is, the sequence number of the SDB frame having an error is marked on the received SDB sequence field 22 of FIG. 3B and the signal NACK is marked on the response field 20. By way of example, if the SDB frame (3) has errors, the BS 4 sends a response message containing the signal NACK (3) in FIG. 4A. The BS 4 sets the timer T_NACK in step 322 to determine receiving period when the signal NACK is not reliably sent to the MS 2 as shown in FIG. 4B.

Upon receipt of the response message including the signal NACK (3) from the BS 4, the MS 2 checks the received SDB sequence field 22 of the response message in step 221. The MS 2 retransmits the SDB frame (SDB frame (3) in FIG. 4A) corresponding to the sequence number in step 222. It is optional for the BS 4 to send a signal ACK(3) for the retransmitted SDB frame (3) to the MS 2, and for the MS 2 to determine whether the signal ACK(3) is received until the timer T_RBP has expired. For example, even if the BS 4 sends no response message for the retransmitted SDB frame (3) until the timer T_RBP has expired, the MS 2 considers the transmission successful.

If the MS 2 fails to receive the response message including the signal NACK(3), the MS 2 considers the previous SDB frame transmission successful and sends the next SBD frame to the BS 4. If the SDB frame for which the signal NACK is generated is not received until the timer T_NACK has expired in steps 308 and 328, the BS 4 retransmits the signal NACK to the MS 2, in step 330. Then, the BS 4 resets the timer T_NACK in step 332. From FIG. 4B, it is noted that the BS 4 resends the signal NACK (3) to the MS 2 when the timer T_NACK has expired.

Meanwhile, if the BS 4 fails to receive an SDB frame until the timer T_SDB has expired in steps 308 and 324, it sends the MS 2 a response message having the signal NACK and a sequence number following the most recently received SDB frame which was transmitted from the MS 2 for the first time marked on the received SDB sequence field 22, in step 326. The BS 4 sets the timer T_SDB in step 318 and goes to step 328. Referring to FIG. 4C, when the timer T_SDB has expired, the BS 4 sends a signal NACK(4) corresponding to the sequence number (4) following the most recently received SDB frame (3).

In step 218 of FIG. 5, the MS 2 determines whether a current SDB frame is the last one, and in step 224, it sets the timer T_RBP. Then, the MS 2 determines whether a response message is received from the BS 4 in step 226.

On the other hand, if the BS 4 receives the last SDB frame (more flag reset) in step 314, it sends a response message including the signal ACK indicating completed reception to the MS 2 in step 334. The BS 4 releases the power-controlled designated common channel in step 336, and reassembles received SDB frames to construct a complete SDB message in step 338.

If the MS 2 fails to receive a response message until the timer T_RBP has expired in steps 226 and 227, it retransmits the most recently sent SDB frame in step 238. Upon receipt of the response message, the MS 2 determines whether the response field 20 of the response message indicates an acknowledgement in step 236. In the case of a negative acknowledgement, the MS 2 retransmits the most recently sent SDB frame in step 238.

If a message received within the duration of the timer T_RBP is not a response message for the most recently sent message in steps 226 and 228, the MS determines whether the response field 20 of the response message is set to ACK in step 230. If the response field is set to NACK, the MS 2 detects the sequence number from the received SDB sequence field 20 of the response message and retransmits the SDB frame corresponding to the detected sequence number to the BS 4, in step 234.

Second Embodiment

A description of the second embodiment of the RBP transmission scheme will now be given with reference to FIGS. 3A and 3B, FIGS. 7A, 7B, and 7C, and FIGS. 8 and 9. In the second embodiment a signal ACK or NACK is generated for each SDB frame received from the MS 2.

Figure 7A:
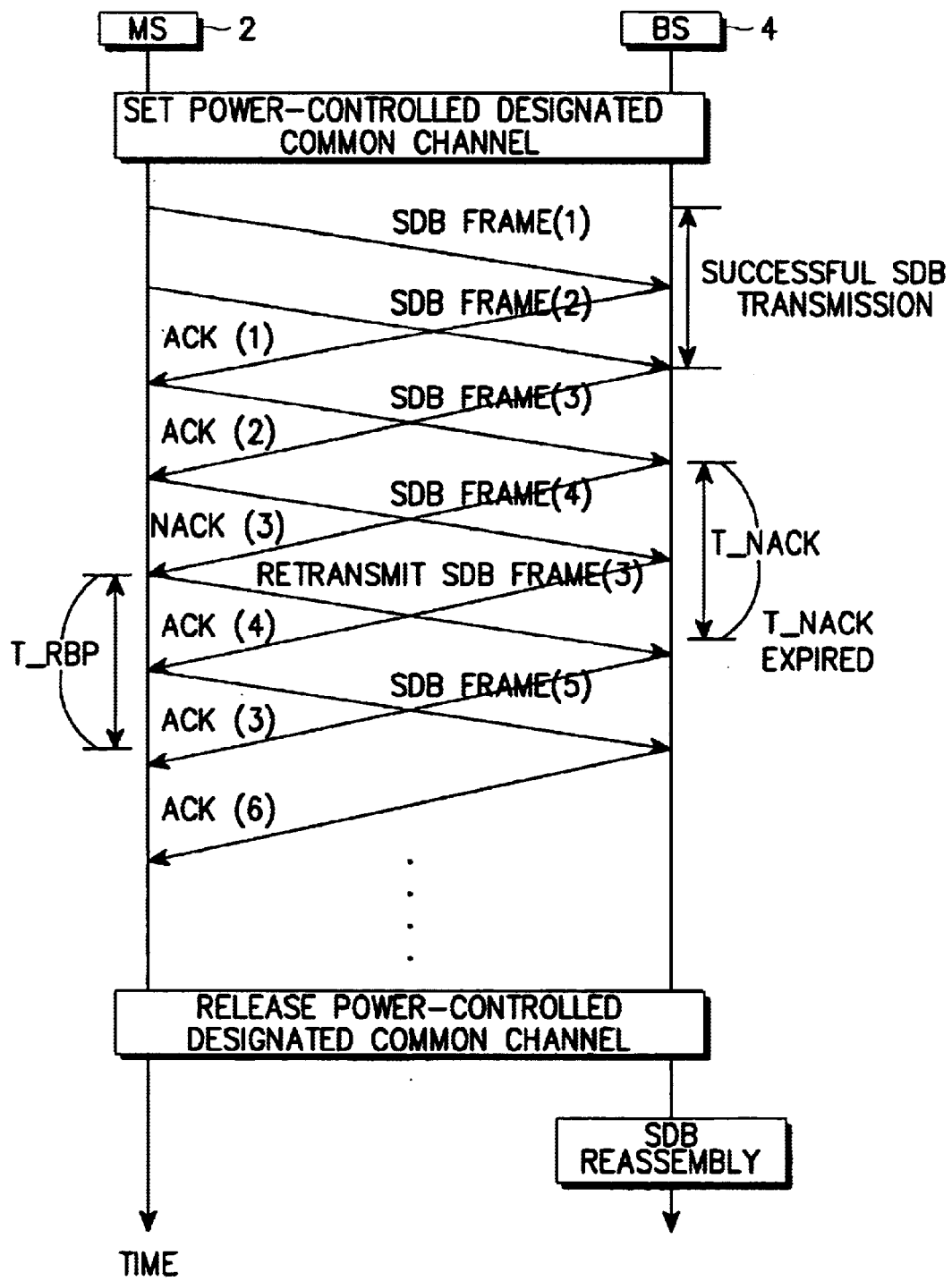
FIG. 7A is a diagram illustrating the exchange of messages and an error correcting operation upon generation of a negative acknowledgement signal NACK according to a second embodiment of the continuous RBP transmission scheme in which a response signal ACK or NACK is transmitted for each received SDB frame.

FIG. 7A is a diagram illustrating a data communication and an error correcting operation upon generation of the signal NACK in the second embodiment of the RBP transmission scheme where the signal ACK is generated for an error-free SDB frame and the signal NACK is generated for an SDB frame. The MS 2 receives a response message from the BS 4 while continuously transmitting SDB frames on a power-controlled reverse designated common channel. If the response message contains the signal NACK, the MS 2 detects an SDB frame having an error by checking the received SDB sequence field 22 of the response message and retransmits the corresponding SDB frame. When the continuous RBP transmission scheme is completed, the BS 4 releases the power-controlled designated common channel and reassembles received SDB frames based on an SDB sequence to construct a complete SDB message.

Figure 7B:
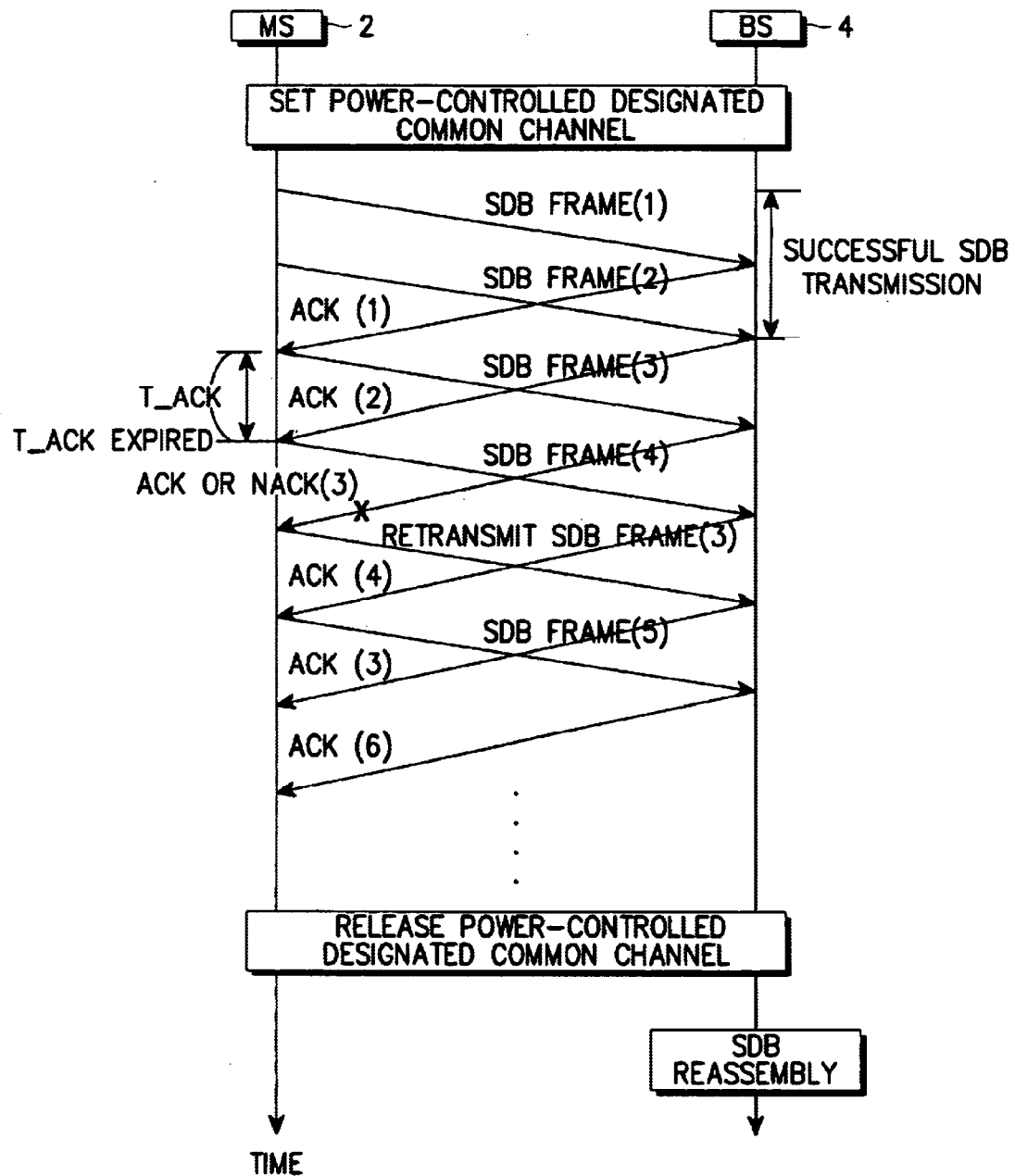
FIG. 7B is a diagram illustrating the exchange of messages and an error correcting operation upon loss of a response signal ACK or NACK according to a second embodiment of the continuous RBP transmission scheme.

FIG. 7B is a diagram illustrating an error correcting operation when the MS 2 fails to receive a response signal ACK or NACK from the BS 4 due to characteristics inherent to a radio environment. The MS 2 sends an SDB frame and sets the timer T_RBP. If the signal ACK or NACK with the sequence number of the sent SDB frame is not received until the timer T_RBP has expired, the MS 2 considers that the SDB frame has errors and retransmits the SDB frame. Alternatively, the MS 2 determines whether to retransmit the SDB frame by setting the timer T_ACK to check a response from the BS 4. When the continuous RBP transmission scheme is completed in this manner, the BS 4 releases the power-controlled reverse designated common channel and reassembles received SDB frames based on an SDB sequence to construct a complete SDB message.

Figure 7C:
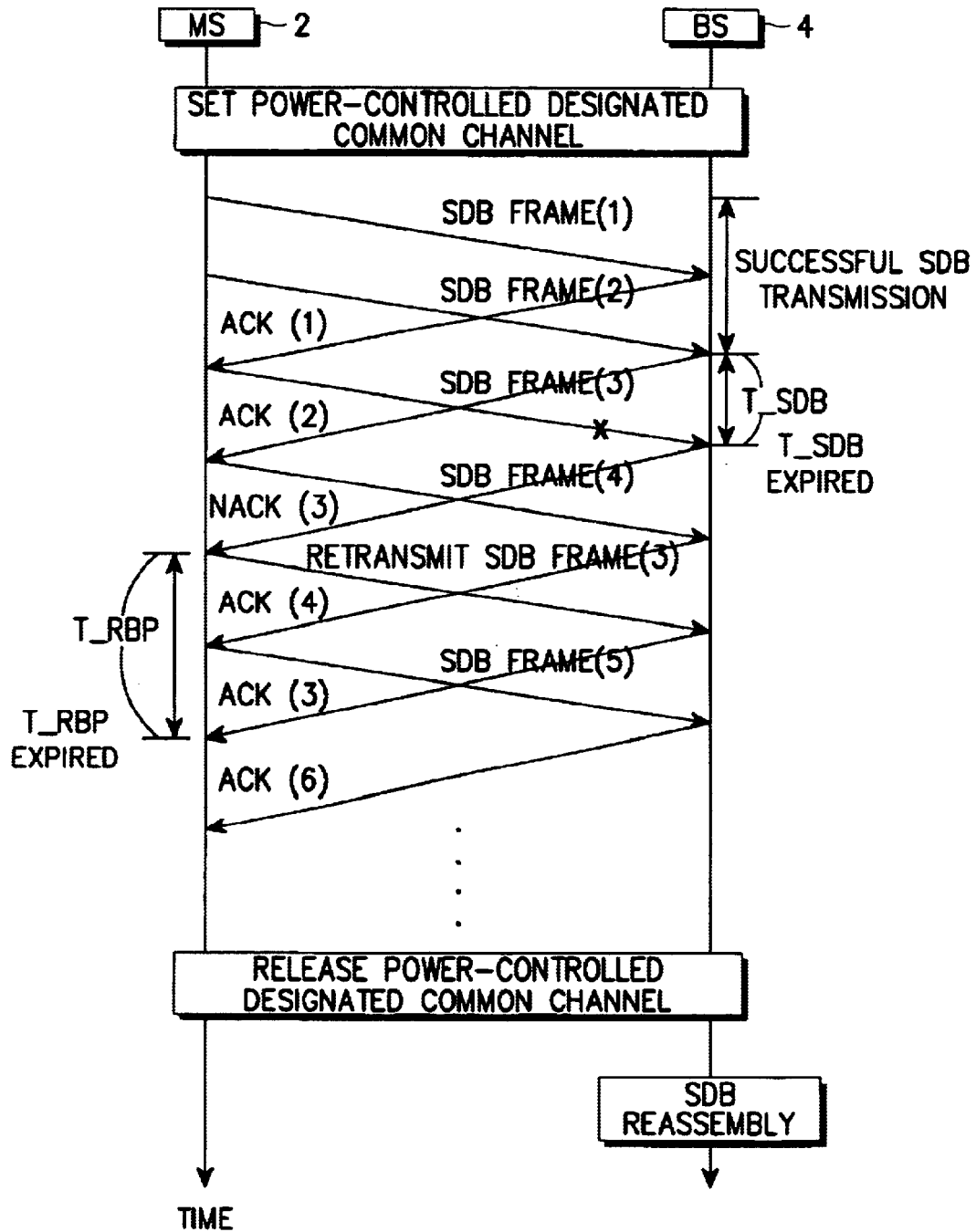
FIG. 7C is a diagram illustrating the exchange of messages and an error correcting operation upon loss of an MS initiated SDB frame according to a second embodiment of the continuous RBP transmission scheme.

FIG. 7C is a diagram illustrating an error correcting operation when an. MS initiated SDB frame is lost during transmission. The BS 4 receives an SDB frame and monitors the more flag field 14 of the SDB frame. If the more flag is set, the BS 4 sets the timer T_SDB and awaits the next SDB frame from the MS 2. If no SDB frame is received until the timer T_SDB has expired, the BS 4 sends the MS 2 a response message including the signal NACK and the sequence number following the transmitted sequence number of the most recently received SDB frame. This error correction can be performed in the MS 2. If no response message is received until the timer T_RBP has expired, the MS 2 considers the most recently sent SDB frame has been lost and retransmits the same SDB frame. When the continuous RBP transmission scheme is completed in this manner, the BS 4 releases a power-controlled reverse designated common channel and reassembles received SDB frames based on an SDB sequence to construct a complete SDB message.

Figure 8:
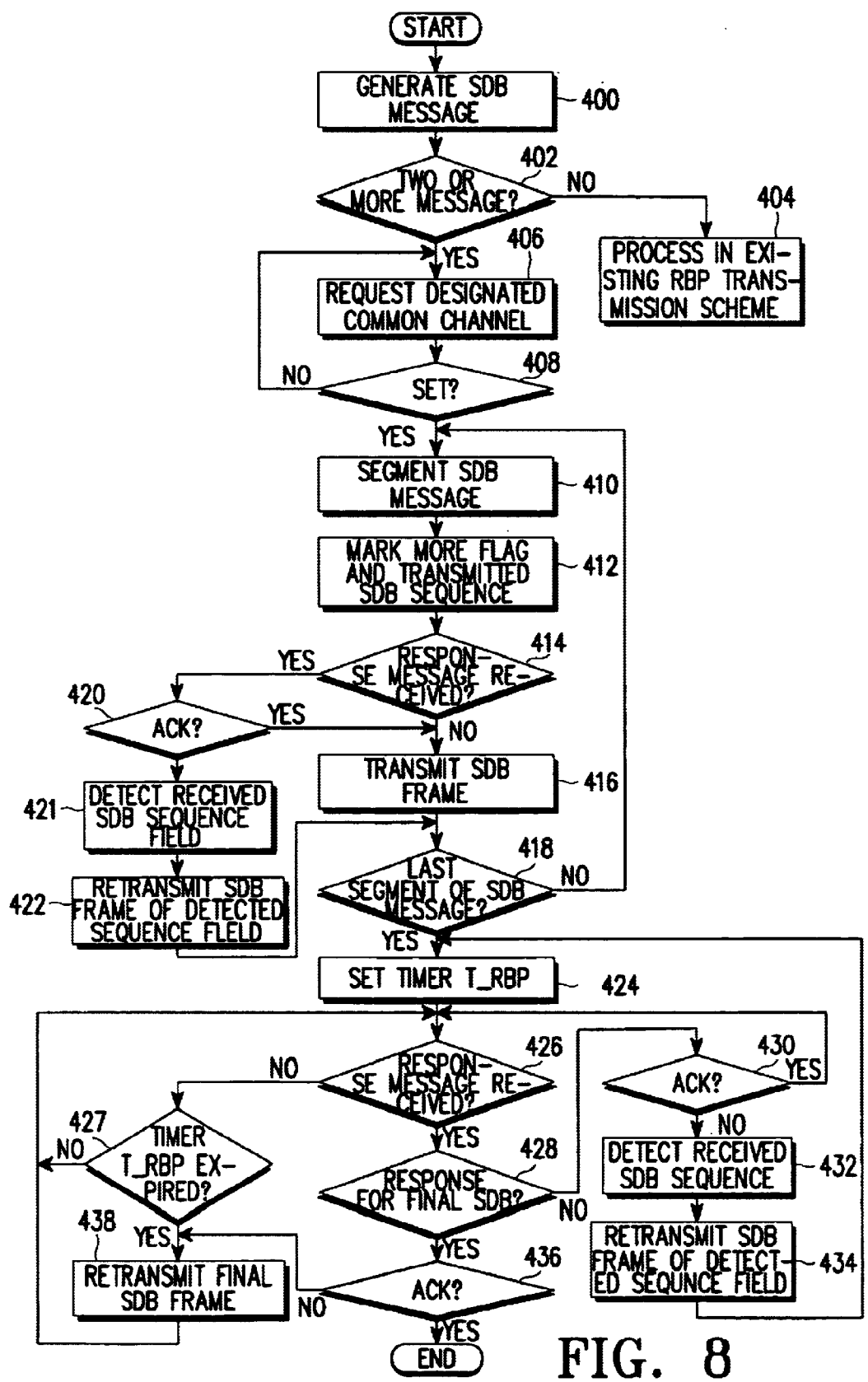
FIG. 8 is a flowchart illustrating an MS operation in the second embodiment of the continuous RBP transmission scheme.
Figure 9:
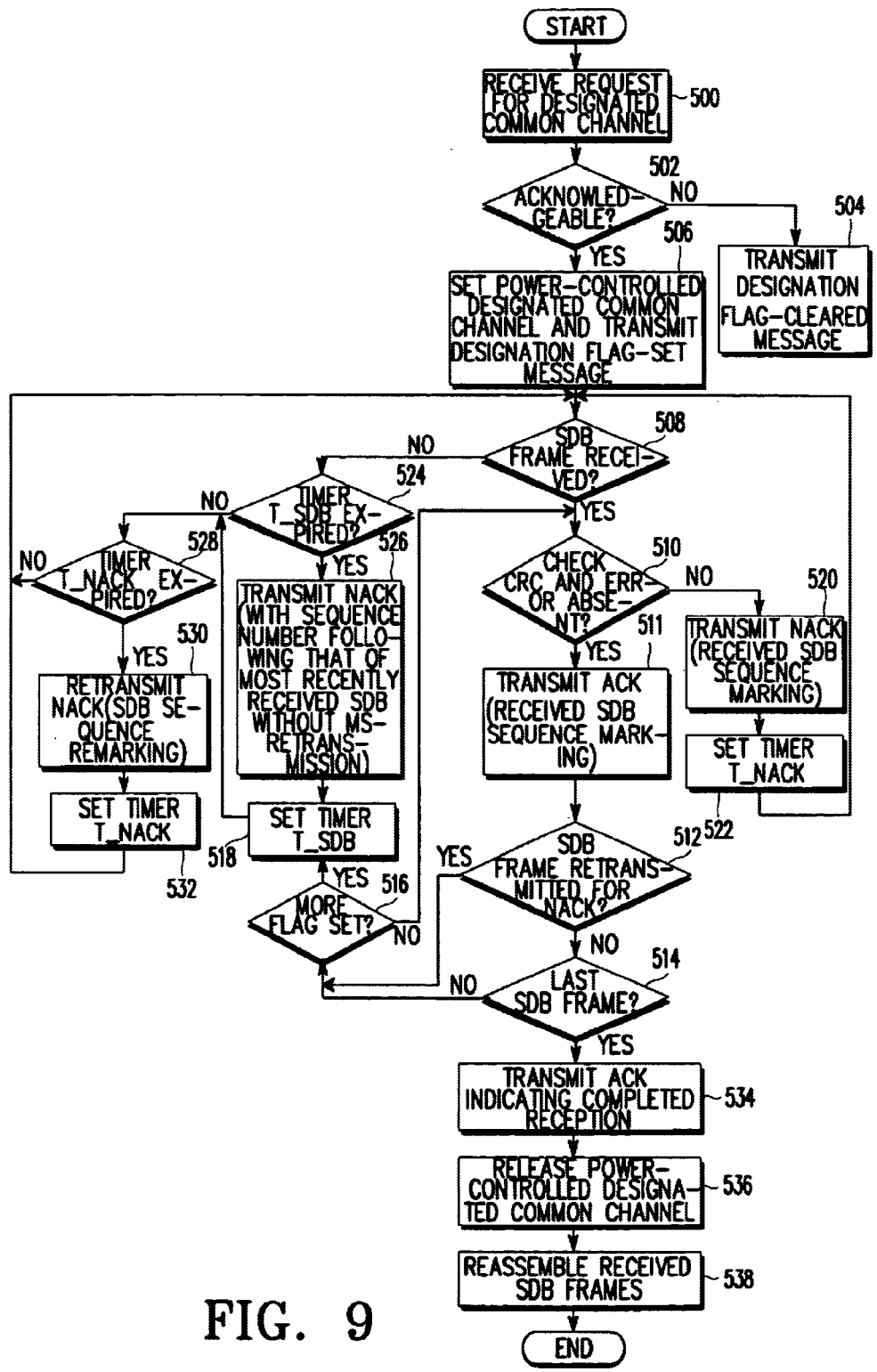
FIG. 9 is a flowchart illustrating a BS operation in the second embodiment of the continuous RBP transmission scheme.
Figure 10:
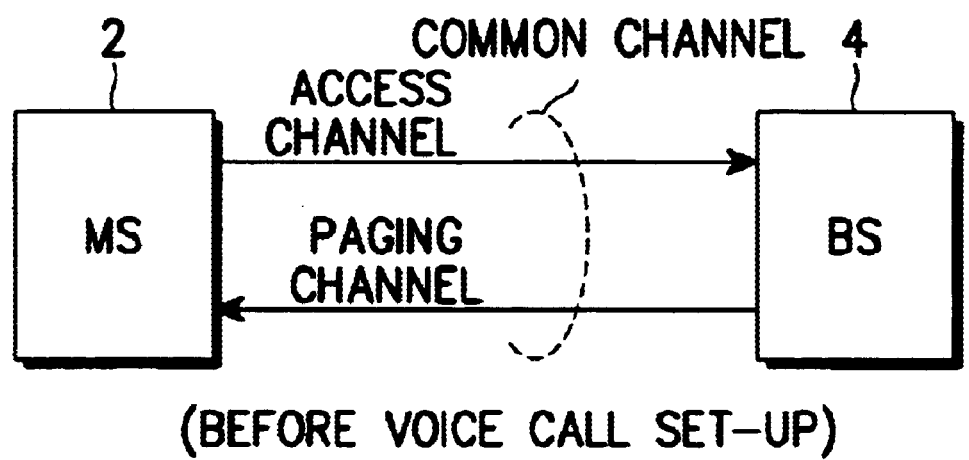
FIG. 10 is a diagram illustrating channels used by the BS and the MS before a voice call set-up.

FIGS. 8 and 9 are flowcharts illustrating an MS operation and a BS operation for the exchange of messages described referring to FIGS. 7A, 7B, and 7C. The MS operation in FIG. 8 is the same as that in FIG. 5 since the signal ACK or NACK is recognized by monitoring the response field 20 of a response message received from the BS 4. That is, steps 200 to 238 of FIG. 5 are almost identical to steps 400 to 438 of FIG. 8. The BS operation in FIG. 9 is different from that in FIG. 6 in that the step of sending the signal ACK is added because the signal ACK or NACK is sent for each received SDB frame. That is, a response message including the signal ACK and a marked received SDB sequence number is sent in step 511.

As described above, the present invention advantageously minimizes a response time and increases transmission efficiency by enabling an RBP transmission of long burst data when a power control is performed on a designated reverse common channel to appropriately control an initial system access power. While the RBP implementation is confined to the dormant state in the existing 3G IS-95, burst data can be continuously transmitted in the suspended state as well as in the dormant state without initializing RLP which is implemented by assigning a control channel when transitioning from the dormant state or suspended state to the control hold state or active state. As a result, a response time and thus a transmission delay of data packet can be reduced.

While the present invention has been described in detail with reference to the specific embodiments, they are mere exemplary applications. Thus, it is to be clearly understood that many variations can be made by anyone skilled in the art within the scope and spirit of the present invention.

What is claimed is:

1. A method of transmitting user data on a reverse common channel with a reverse dedicated channel released, comprising the steps of:

designating the reverse common channel to the reverse dedicated channel;

dividing user data into a plurality of segmented messages if the user data is longer than a data segment in a frame of the reverse common channel;

transmitting the plurality of segmented messages in the data segments of consecutive frames on the designated reverse common channel; and determining whether a base station receives each of the segmented messages.

2. The method of claim 1, wherein the reverse common channel is a power-controlled logical dedicated channel.

3. The method of claim 2, wherein each of the consecutive frames has a segmented message, a sequence number corresponding to the segmented message, and information indicating the presence or absence of a segmented message in a succeeding frame.

4. The method of claim 1, wherein the determining step further includes the step of receiving a response message from the base station indicating reception of each of the segmented messages.

5. The method of claim 4, wherein the response message includes information indicating reception of a particular segmented message, and a sequence number identifying the particular segmented message.

6. The method of claim 1, wherein the determining step further includes the step of receiving a response message from the base station indicating a failed reception of a particular segmented message.

7. The method of claim 6, further comprising the step of retransmitting, by the mobile station, at least the particular segmented message in response to the mobile station receiving the response message indicating a failed reception of the particular segmented message.

8. The method of claim 7, further comprising the step of determining by the mobile station whether a response message indicating reception of the retransmitted segmented message is received from the base station.

9. The method of claim 8, further comprising the step of determining whether the response message indicating reception of the retransmitted segmented message is received from the base station within a predetermined time period.

10. The method of claim 9, wherein the response message indicates reception of the retransmitted segmented message in the base station if the response message is received from the base station within the predetermined time period.

11. The method of claim 1, further comprising the step of determining whether a response message indicating reception in the base station of a last segmented message is received from the base station.

12. The method of claim 11, further comprising the step of determining whether the response message indicating reception of the last segmented message is received from the base station within a predetermined time period.

13. The method of claim 11, further comprising the step of the base station retransmitting the last segmented message if the response message indicating reception of the last segmented message is not received from the base station within a predetermined time period.

14. The method of claim 11, further comprising the step of the base station transmitting a succeeding segmented message based on receiving a response message from the base station if the received response message does not correspond to the response message indicating reception in the base station of the last segmented message.

15. A method of receiving a message via consecutive frames on a designated reverse common channel from a mobile station to a base station, where the message is segmented into a plurality of message segments and each of said consecutive frames includes a user data field on which one of the plurality of message segments is loaded, and a field indicating whether a following frame contains a message segment, said method comprising the steps of:
   checking the more flag field of each frame;
   checking CRCs (Cyclic Redundancy Codes) of each frame; and
   determining whether the totality of message segments transmitted via the consecutive frames are received at the base station by checking a count of the more flag field.

16. The method of claim 15, wherein the reverse common channel is a power-controlled logical dedicated channel.

17. The method of claim 15, further comprising the step of transmitting a response message from the base station to the mobile station upon the base station receiving one of the plurality of message segments, said response message indicating reception of one of the plurality of message segments.

18. The method of claim 17, wherein the response message includes information indicating reception of one of the plurality of message segments, and a sequence number of said one of the plurality of message segments.

19. The method of claim 17, further comprising the step of making a second transmission request by the mobile station for one of the plurality of message segments, if said one of the plurality of message segments is not received by the mobile station within a predetermined time after reception of a previous message segment.

20. The method of claim 19, further comprising the step of transmitting a response message, by the mobile station, indicating reception of the retransmitted one of the plurality of message segments to the mobile station, said response message being transmitted after a predetermined time from the transmission of the retransmission request.

21. The method of claim 15, further comprising the step of sending a response message to the mobile station indicating reception of a last message segment of the plurality of message segments upon reception of the last message segment by the base station.

22. The method of claim 15, further comprising the step of requesting retransmission of a message segment, by the base station, of said plurality of message segments, if said message segment has an error.

23. The method of claim 15, further comprising the steps of:
   determining whether reception of the plurality of message segments has been completed by continuously checking the more flag fields; and
   reassembling the received plurality of message segments when reception has been completed.

* * * * *